United States Patent [19]

Stockman

[11] 3,975,985

[45] Aug. 24, 1976

[54] MASTER FOR ENGRAVING GRAPHICAL REPRESENTATIONS UPON WORKABLE MATERIALS

[76] Inventor: John H. Stockman, 268 Vineyard Point Road, Guilford, Conn. 06437

[22] Filed: Feb. 9, 1976

[21] Appl. No.: 656,612

Related U.S. Application Data

[60] Division of Ser. No. 615,924, Sept. 23, 1975, which is a continuation-in-part of Ser. No. 473,010, May 24, 1973, Pat. No. 3,915,061.

[52] U.S. Cl. .................................. 90/62 R; 90/13.1

[51] Int. Cl.[2] ........................................ B23C 1/16

[58] Field of Search ............ 90/62 R, 13.1; 33/23 K

[56] References Cited

UNITED STATES PATENTS

| | | | |
|---|---|---|---|
| 684,971 | 10/1901 | Barr | 90/62 R |
| 732,154 | 6/1903 | Barr | 90/62 R |
| 732,694 | 8/1903 | Austin | 90/13.1 |

*Primary Examiner*—Gil Weidenfeld
*Attorney, Agent, or Firm*—Stefan J. Klauber

[57] ABSTRACT

A master for engraving three-dimensional graphic intelligence upon workable stock, utilizing a three-dimensional pantograph engraving machine. The master is prepared wherein analogs of engraved graphics are defined by constant width U-cut channels. The depth of a U-channel is proportional at each point to the width of the corresponding graphic. The master is positioned at the master object receiving bed of the pantograph machine and desired analogs are traced, utilizing as the tracing element a cylindrical stylus having a diameter approximating that of the channels. A work cutting tool moves homologously with the stylus to cut the workable stock. The tool is adapted to sweep a cone during rotation, whereby a graphic is produced having a width at the surface of the work piece, and a depth at each point, which is proportional to the vertical excursion of the tracing element during its pass through the U-channel of the master, thus producing graphics having the attributes of a true hand engraving.

3 Claims, 12 Drawing Figures

FIG. 1
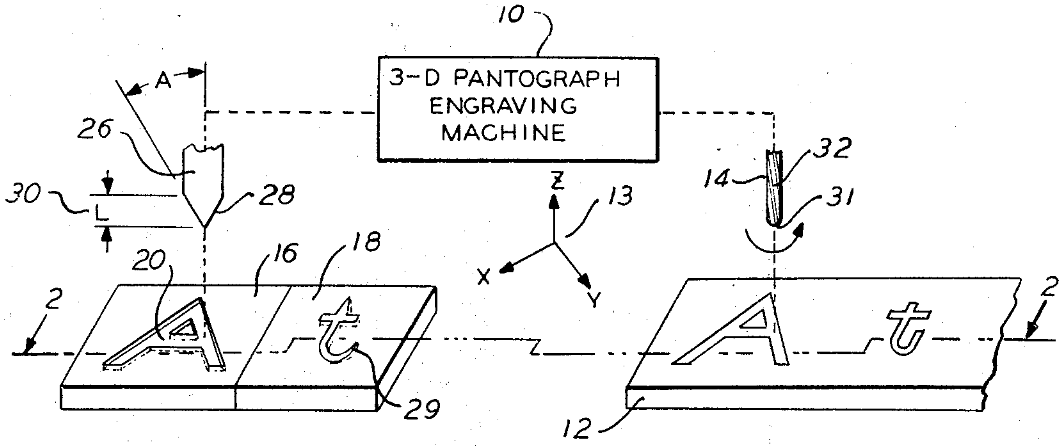
FIG. 2
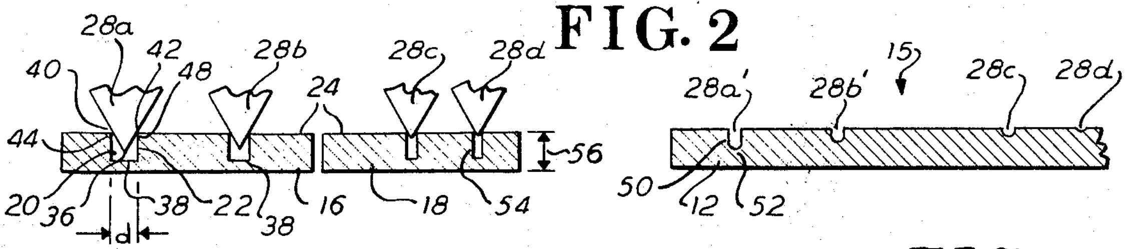
FIG. 3
FIG. 4
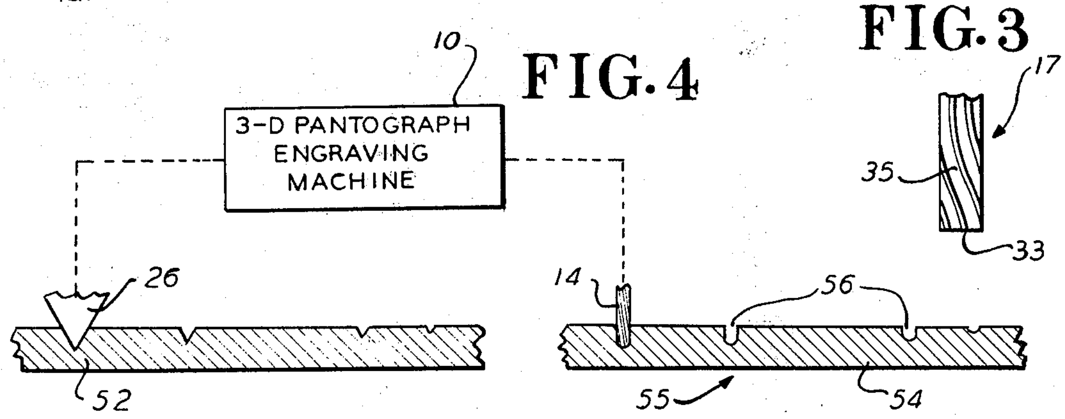
FIG. 5
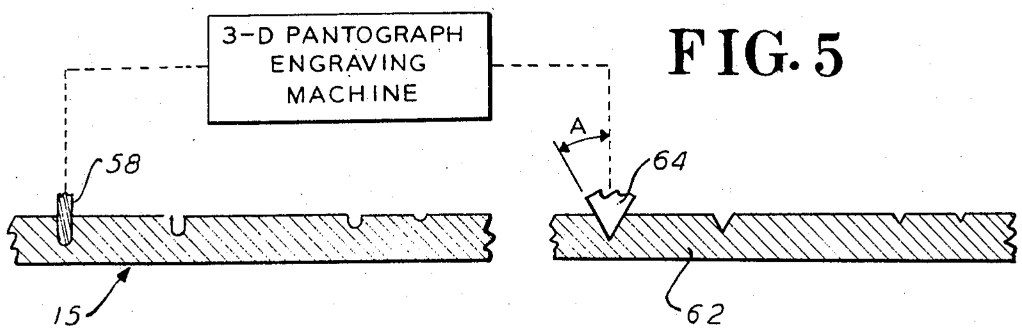

MASTER FOR ENGRAVING GRAPHICAL REPRESENTATIONS UPON WORKABLE MATERIALS

BACKGROUND OF INVENTION

This is a division of application Ser. No. 615,924 filed Sept. 23, 1975 which application is a continuation-in-part of my copending application, Ser. No. 473,010, filed May 24, 1973, now U.S. Pat. No. 3,915,061 for "Method for Engraving Graphical Representations on Workable Materials".

This invention relates generally to methods and apparatus for producing inscribed graphic representations on workable material, and more specifically relates to method and apparatus for engraving such representations upon wood, metal or other materials.

The presentation of graphic material such as words, symbols and similar alpha-numeric information, and of other graphic intelligence by inscribing such intelligence upon workable materials, is an art that is almost as old as civilization itself. Needless to say, however, such art remained for centuries a laborious skill, the results of which depended upon the individual artisan's talents and available time. Considering more specifically one particular field to which the present invention has application, it may thus be noted that wooden signs, such as those identifying the occupant of a home, or a business establishment, etc., were, prior to the industrial revolution, produced by hand-carving the required information upon the wood or other workable stock. Within recent times, however, such hand carving has become a little practiced art, in that not only are the required skills in very short supply, but moreover labor costs have become so high as to all but preclude use of these techniques.

Here it may be noted that while early inscribing techniques such as mentioned above for inscribing wooden materials, utilized simple hand carving tools, hand engraving with rotating tools is now widely utilized, as for example, in the customized engraving of silverware, jewelry, etc., and in corresponding processes for engraving graphic information on stone surfaces such as momuments or the like. These techniques are basically updated versions of early hand carving methods. As is well-known, however, the cost of such procedure is exceedingly high, and needless to say does not lend itself to any mass producing operations.

The typical mass produced carved letter sign, such as for example, the name posts utilized at a home owner's premises, or as another example a nameplate utilized in an office or the like, is in fact machine-produced with a pantograph apparatus. These pantograph apparatus are well-known in the art, and basically consist of a cutting tool and a linked tracing stylus. A stencil carrying the appropriate alpha-numeric matrix or other information is positioned so that the stylus may be applied to desired letters and as the said letters are traversed the cutting tool follows in homologous fashion, cutting into the surface of the work piece. In the principal techniques followed in the past, it has been contemplated that both cutting tool and stylus substantially move in only two dimensions during the process. What basically happens therefore, is that the cutting tool proceeds at a fixed depth within the work piece, in consequence of which these low cost signs display letters wherein the cut lines are characterized by uniform depth; and wherein the width of the cut lines, if variable, is achieved by multiple passes of the cutter at the same depth. Unrounded corners, that is to say, sharpness in the corners, is not possible pursuant to such approach as the cutter traces an arc at the end of each line which is cut.

Those who are familiar with the discussed arts, are thus abundantly aware of the vast differential in appearance, as between lettering created by hand engraving or carving techniques, and the lettering provided by conventional pantograph machine cutting methods; and it may be noted that even the uninitiated readily observe the far more aesthetically appealing characteristics of the hand engraved graphics. Here it may be noted that an analysis of objects produced by the two techniques, establishes the basis for the distinctions mentioned. Such analysis reveals that hand engraved letters and symbols are typically characterized, not only by a variation in width of the various portions of the letters, but moreover by variations in depth of cut into the stock, which bears a relationship to the width of the letter or other representation at the given point. These characteristics will become increasingly evident in the ensuing specification, but it may be noted that in consequence of the cited relationship completely sharp corners are evidenced only in the hand-carved letters, and moreover aesthetically appealing shadows and contrasts are introduced by the variable depths and widths of said symbols.

The aforementioned pantograph machines, are not in all instances limited to the two dimensional mode of operations. Indeed, pantograph machines are also known which are capable of three-dimensional use, that is to say, use wherein the cutting tool may follow the stylus not only with respect to the stylus movements in a plane, but also with respect to vertical variations above and below the said plane. In the past, however, the principal manner in which such three-dimensional machines have been contemplated for use in three-dimensional applications has been as follows: presume that a duplicate is to be made of a three-dimensional graphic representation, or of other form which can be followed by the stylus. Utilizing a cutting tool of relatively small dimensions, one endeavors to pass the stylus over and contact all accessible surface points of the presentation or object to be duplicated. The cutting tool in consequence removes small portions of the work piece as each point of the corresponding surface (of the master) is contacted by the stylus. If accordingly, the operator is indeed skillful and careful to assure that all points on the master surface are contacted through repeated passes of the stylus and cutter, a duplicate will be substantially provided. It will, however, be clear from the description of the technique set forth, that much skill and investment of time is required to achieve a good result.

In some instances it may be further noted, proposals have been made for other techniques utilizing three-dimensional pantograph machines for providing graphic engraving on work pieces. In U.S. Pat. No. 741,442, one of a series of patents to an early investigator, M. Barr, it is, for example, contemplated that a line engraving may be produced on a work piece by initially providing an enlarged photograph of the graphic to be reproduced, and transferring or affixing the said photograph on a slab of gypsum or similar frangible material. Thereafter it is contemplated that one substitutes for the usual tracer element a rotating conical cutting tracer, which is homologous with the engraving tool.

Thereupon one passes the cutting tracer over the photograph and manually lowers or raises the cutting-tracer, so that it may penetrate more or less deeply into the pattern, and by reason of its conicity cut a wider and deeper or narrower and shallower furrow, the object being to cut away all and no more than the lines of the pattern. The engraving tool moving in homologous fashion, thereby provides a corresponding three-dimensional engraving. This technique, while of considerable interest, has little practical value in that firstly a vast amount of time and effort is involved in preparation of the "master", which is then promptly destroyed in the very act of providing the duplicate engraving. Perhaps of at least equal significance, is the fact that the technique used requires that the operator at all times exercise demanding judgment and manual control in keeping the cutter precisely within the confines of the photograph master.

In another patent of the same M. Barr, U.S. Pat. No. 684,971, there is described a technique for producing engraved plates for use in printing applications. In particular, a plate is utilized having a pattern consisting of incised lines or grooves to a greater or lesser depth according to their width. As the grooves are traced, a cutting tool capable of vertical motion is linked by a pantograph connection to follow the movements of the tracer tool, whereby it produces an engraving which is characterized by increase in depth of the line with an increase in width. The consequence of this arrangement, as indicated in the patent, is that the printed character which results from use of the engraved plate, has a greater body of ink on it per unit of area in the case of a wide line than it has in the case of a narrow line.

In my aforementioned copending application Ser. No. 473,010 I have disclosed method and apparatus combinations, based upon use of a conventional three-dimensional pantograph engraving machine. The latter machine, as is known in the art, conventionally includes a bed for receiving the "master" object to be reproduced, a tracing stylus overlying the bed and adapted to be passed in contact with surface portions of the object to be simulated, and a work-piece receiving station adapted to receive a piece of work stock. A rotating cutting tool is linked through a pantograph linkage to the tracer stylus as to move homologously therewith, thereby providing cutting action at the workpiece location, which is homologous with respect to the tracer movements at the original object.

In the teachings of my Ser. No. 473,010 application one initially positions as the "master" object, a stencil plate. Such plate carries thereon voids, the boundaries of which at the plate surface define the identity of the graphics to be engraved at the work piece. The tracing stylus comprises a conical-tipped element, the conical portion of which has an included angle and an axial length in relationship to the voids, such that the stylus may transverse the entire graphic defined by a void or series of voids, with the edges of the cone at all times contacting and being limited in downward movement by the lateral boundaries of the voids. By this arrangement the vertical excursions of the stylus into the voids varies in accordance with the separation of the restraining lateral edges of the void at the surface of the plate. The cutting tool comprises a rotating cutting head, the tip of which is adapted to sweep a cone during rotation thereof. Accordingly, with the cutting tool in contact with a first work piece, and with the said tool undergoing three-dimensional excursions homologous to those of the stylus, a graphic may be cut having an outline at the plane surface of the first work piece which is geometrically similar to the outline of the graphic on stencil; and furthermore the cut graphic will have a depth at each point thereof corresponding to or similar to the depth of descent of the tracing element during passage through the voids defining the graphic at the stencil. The stencil plate referred to may comprise flat walled cutouts into or through the plate. The width of the cutouts, at the surface of the plate corresponds to the desired form of the graphic to be cut. The plate itself may be of sufficient thickness to enable the required excursions, or a thin plate may be maintained during the cutting operations in spaced relationship from an underlying surface to permit the required excursions.

The resultant work piece — which may then be referred to as the "master" — thus includes graphics which are defined by V-cut channels, the depth of which are proportional to the width of the graphics at the surface of the said master. This master may then be positioned at the master object receiving bed of the pantograph and traced in a single pass, utilizing as the tracing element a conical-tipped stylus having an included angle no greater than the included angle of the V-cut channel. A work cutting tool moves homologously with the stylus to cut workable stock. The tool is adapted to sweep a cone during rotation, whereby a graphic is produced on the stock having an outline which is geometrically similar to the outline of the graphic on the master, and a depth at each point similar to the vertical excursion of the tracing element during its pass through the V-cut channels of the master.

While the techniques thus disclosed in my Ser. No. 473,010 application yield highly usable and novel results, it has been found in practice that the V-cut masters which are formed and utilized in accordance with that invention present certain problems which restrict the efficacy of the method. In particular, it is found that a relatively high degree of skill is required to appropriately guide the stylus through the V-cut channels. In addition, it will be obvious upon considering the mode of use, that a relatively high degree of pressure occurs at the apex of the "V" which, in turn, limits the useful life of the master.

In accordance with the foregoing it may be regarded as an object of the present invention, to provide method and apparatus which enables production of engraved graphics at exteemely low cost, and without the utilization of skillful personnel; which graphics however, are equal in quality to the best hand-engraved products.

It is a further object of the present invention, to provide method and apparatus which enables production of engraved graphics by the use of masters, which by virtue of their construction characteristics and the mode of use thereof, possess extremely long life, and yield outstanding results when utilized by persons of limited skill.

SUMMARY OF INVENTION

Now in accordance with the present invention, the foregoing objects, and others as will become apparent in the course of the ensuing specification, are achieved in a method based upon a three-dimensional pantograph engraving machine, wherein a master is prepared in which analogs of engraved graphs are defined by constant width U-cut channels, the center line of the U-channel defining a pattern geometrically similar to the graphics to be engraved. The depth of a U-cut channel is proportional at each point to the width of the corresponding graphic. The said master is positioned at the master object receiving bed of the pantograph machine, and desired analogs are traced, utilizing as the tracing element a ball end cylindrical stylus having a diameter approximating that of the channels. A work-cutting tool moves homologously with the stylus to cut the workable stock. The V-shaped tool is adapted to sweep a cone during rotation, whereby a graphic is produced having a width at the surface of the work piece and a depth at each point, which is proportional to the vertical excursion of the tracing element during its pass through the U-channel of the master. By virtue of the constant width of the aforementioned U-channel, the stylus is guided therethrough in unusually accurate and firm fashion — as the only variations (other than in the X—Y plane) are changes in vertical height effected by virtue of the depth of the U-channel.

The masters of the invention may be prepared by a number of techniques. In one such technique, for example, a stencil plate includes voids, the width of which at the surface of the stencils defines the graphics. The voids can be traced on the aforementioned 3-D pantograph machine using a conical tip stylus, as a cylindrical cutter moving homologously with the stylus operates on a first work piece — to produce the master for use with the present invention. A similar arrangement may be employed to prepare the said masters, but utilizing instead of the aforementioned stencil plate, a V-cut master of the type disclosed in my Ser. No. 473,010 application. Other techniques may also be utilized to prepare the master — including preparing same from a line cut photo-engraving; by first preparing a stencil plate of the type mentioned, and then reiterating the cited operations upon the stencil plate.

BRIEF DESCRIPTION OF DRAWINGS

The invention is diagrammatically illustrated, by way of example, in the drawings appended hereto, in which:

FIG. 1 is a perspective, highly schematic view, illustrating a method for preparing a master in accordance with the present invention;

FIG. 2 is a cross-sectional view taken along the line 2—2 of FIG. 1;

FIG. 3 is a fragmentary plan view of an alternate type of cutting tool which may be utilized in preparing the masters of the invention;

FIG. 4 is a cross-sectional view similar in nature to FIG. 2, illustrating the manner in which a master may be prepared in accordance with the invention, starting with a V-cut master of the type disclosed in my aforementioned Ser. No. 473,010 application;

FIG. 5 is a simplified cross-sectional view illustrating the manner in which a master prepared by the invention may be utilized to produce corresponding derivative graphics;

DESCRIPTION OF PREFERRED EMBODIMENT

Figure 6:
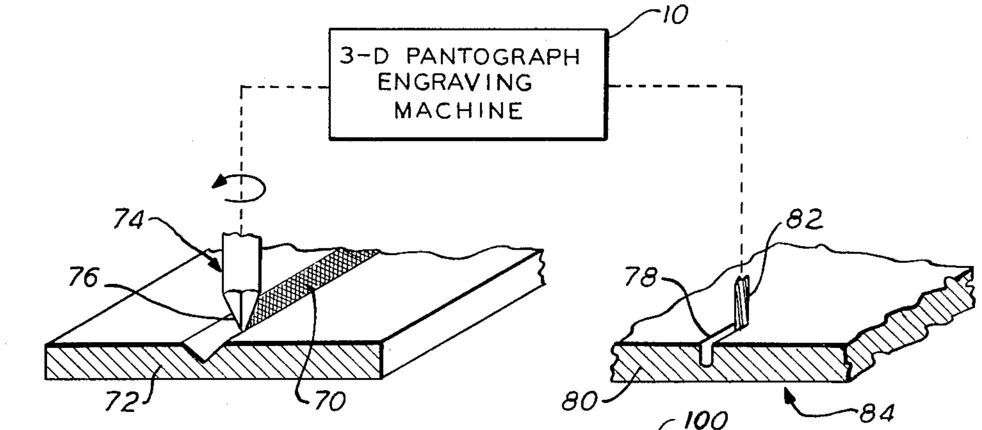
FIG. 6 is a simplified perspective view illustrating a further techniques pursuant to which the masters of the invention may be prepared.

In FIG. 1 herein a perspective, highly schematic view is set forth, depicting one manner in which a master may be prepared for use with the present invention. As has been previously indicated, the invention utilizes a so-called three-dimensional pantograph engraving machine, which is schematically illustrated by the block 10 in FIG. 1. It should be understood in this connection that the said machine 10 is not per se of the present invention, and accordingly no attempt is made herein to illustrate the said machine. In point of fact, such machines have been known for very many years, early versions thereof dating well back to the early part of the present century. A suitable model for present purposes, for example, is available from Scripta S.A., Paris 11, France, under the model designation SR3D. The machines in question are principally characterized as including a master receiving bed, at which an object to be followed with a stylus is normally mounted, and a work-receiving station at which a work piece is mounted. A rotatable driven shaft generally overlies the work-receiving station, and is powered by suitable motor means. The said shaft which is adapted to receive some type of cutting tool or the like, is connected through the usual pantograph linkage of the said machine to the stylus, so that as the stylus is made to pass over the surface of the master (after suitable allignment is first made between the surface of the master and the work stock and the cutter and stylus) the cutting tool will then traverse in homologous fashion over portions of the work piece. As has been previously indicated, and although such mode has not normally been used in the cutting of graphics, this type of machine is capable of a use wherein as the stylus progresses over various portions of the master surface, the cutting tool cuts away at the work piece to produce a surface having point-to-point conformance with the specific spatial points traced by the stylus. As used here the work "master" refers, of course, to the object placed at the master receiving bed of the pantograph apparatus.

In accordance with the present invention, methods are set forth enabling highly useful new results to be achieved with the above-described pantograph machines. In order to concretely illustrate the mode of operation of the present invention, it may be assumed in FIG. 1, that a block of material is positioned as the work piece 12 at the aforementioned work piece receiving station of apparatus 10. Work piece 12 may constitute any of a variety of materials that are workable by the rotatable cutting tool 14 utilized in the invention, and may therefore be constituted of wood, plastics, ceramics, metals or other workable materials. Since however, piece 12 will itself ultimately be used as a master, it is desirable that it be relatively durable, in order to enable numerous tracings with a stylus. Piece 12 is therefore preferably formed of a tough, long wearing material such as a lucite, a PVC-type plastic, brass, etc. For purposes of concretely illustrating the FIG. 1 process, it may be assumed that a graphic representation is to be placed on piece 12, such as a lettered sequence "At".

In order to provide the desired cut graphic sequence, there is positioned at the master receiving bed a series of stencil plates, such as at 16 and 18, which in totality provide the desired graphic sequence. Of course, it is equally within the province of the invention for a single such plate to be utilized containing the desired information (which can of course be an entire alphanumeric set). Referring particularly, for example, to the plate 16, it is seen that such plate comprises a slab of material, for example, of metal, plastic or other relatively durable substance, into which is cut voids 20, which define a given graphic such as the character "A" on plate 16. In the embodiment of the invention appearing in FIG. 1, as best seen by reference to the cross-sectional view of FIG. 2, the said voids 20 are bounded by walls 22, which are perpendicular to the surface 24 of the plate 16. These walls 22 descend into the material to a common level, and may pass completely through the material, as it is not the depth of the voids that is of significance but only the spacing d between void edges 44 and 48 as the surface 24 of the plate (provided however that the depth of the voids be sufficient in consideration of angle A and L to enable the said edges to constitute the restraints on the stylus descent). The stylus 26 thus includes a conical tip 28, characterized by an included angle A at the cone, with the conical tip further having an axial length 30 of value L. The said stylus 26 does not in any manner rotate, but is merely intended to traverse the voids defining the graphic intelligence.

Continuing to refer to FIG. 1, it is further seen that the rotatable tool 14 comprises a simple cylindrical cutter having cutting flutes 32. The tool 14 is of generally uniform cross-section, and preferably has a ball end 31, with cutting flutes 32 extending to the bottom, rounded portion. In an alternate embodiment (FIG. 3) a tool 17 may be used having a flattened bottom 33 — and cutting flutes 35.

The cross-sectional view of FIG. 2 illustrates the manner in which the stylus 28 is made to traverse varying portions of the voids defining the graphics at plates 16 and 18. In order to provide directional reference for discussion herein, a set of right-hand orthogonal coordinate axes 13 are set forth (in FIG. 1), with the X and Y-axes corresponding to the horizontal plane, and the Z-axis being oriented along the normal to such plane at the intersection of the X and Y-axes.

The stylus tip is indicated by 28*a*, 28*b*, 28*c* and 28*d* to illustrate several different positions in its path of traverse, but it will of course be understood that the same stylus is depicted at each of these said points. Firstly, it will be noted that the stylus tip 28, is so designed that as the stylus conical tip 28 traverses the various voids in plates 16 and 18, the apex 36 of the stylus tip will in general not descend to the bottom 38 of the said voids, but rather the downward excursion of the stylus will be limited by the sides 40 and 42 of the tip 28 contacting lateral edges 44 and 48 of the voids at surface 24 of the plate. To put this aspect of the invention another way, the conical tip 28 of the stylus may always descend within the void to a degree specifically limited by the separation d of those edges of the void at the surface 24 of the plate which contact the tip. Thus it is seen that the conical tip at 28*a* and 28*b*, which defines the "legs" of the character "A", descends to a relatively large excursion, while at the position designated 28*c*, which constitutes the bar of the script letter *t*, the stylus decends a much lesser degree; and finally at the position designated 28*d*, the stylus as it passes over the relatively sharp termination of the script *t* descends but a miniscule distance within plate 18.

The net result of the foregoing sequence of events may be seen from examination of the right-hand side of FIG. 2, wherein the specific cuts which are effected by the homologous movements of tool 14 are seen. From this it may be observed that the cut provided in piece 12, at various corresponding points such as 28*a'*, 28*b'* and 28*d'*, in all cases are defined by parallel constantly-spaced walls 50, whereby a simple U-cut channel of constant width is generated, the center line of which defines a graphic pattern geometrically similar to the center line of the graphics on plates 16 and 18, the depth of the U-cut, however, varying at each point in accordance with the depth of descent of stylus 26. Accordingly, for example, it is seen that as one progresses to the right on the Figure, the width of the U-channel remains constant, but the depth decreases successively from 28*a'* to 28*b'* etc., to 28*d'*. Accordingly, it will be evident from the foregoing, that a net result of the present process is that the two-dimensional characteristics of the graphics on plates 16 and 18 — by which it is meant the separation of the edges of the graphics as they appear on the surface 24 of the plates 16 and 18, has been converted into analogs at work piece 12 having variations not in width of the cut channel — but rather in depth. Thus, in this connection it will also be appreciated that the total thickness 56 of the stencil plates 16 and 18 is of significance of this aspect of the invention, only in that a certain thickness is required to permit sufficient excursion for the stylus 28. Accordingly the voids need not necessarily be defined by vertical walls as illustrated extending into a solid block of material, but for example, a thin plate of material containing the voids defining the graphics, could be suitably spaced from an underlying surface so as to permit the required stylus excursions. This is to say that the plate 16 or 18 function in an identical manner if it is internally hollow. This latter construction would of course, require support legs or the like, extending from "cut-off" portions of graphics to the underlying interior base of the hollow structure — e.g., to support the central circle of the letter *o*. As will be discussed further hereinbelow, the work piece 12, following the operations so far discussed, may be utilized with a pantograph 10, as a master for production of derivative works. cut piece 12 may therefore be referred to hereinbelow as a "U-cut master", in recognition of the fact that the analog graphics thereon are indeed defined by U-cut channels of uniform diameter, the depth of which varies in accordance with the width of the graphic represented by the analog.

It should, at this point, be appreciated that FIGS. 1 and 2, depict but one specific method that may be utilized to prepare the U-cut masters — which will hereinafter be utilized in producing derivative graphics. A variety of several other techniques may be utilized in the course of preparing a U-cut master of the type indicated. It should however be appreciated that once the initial master 15 is prepared, replica masters for use by craftsman, e.g. in a master subsequently to be set forth in connection with FIG. 5, need not be prepared by the relatively sophisticated techniques in FIGS. 1, 2, 3, and 6 through 9. This is to say, that once an initial master 15 is prepared, duplication on a 3-D pantograph may be utilized to prepare any desired numbers of derivative masters — which items are then made available to consumers for use in preparing end products such as, for example, engraved nameplates or engraved intelligence upon metal, stone or other workable materials. Thus it is emphasized that each "master" and mode of preparing same as discussed in this specification is not necessarily the same master which is provided as a commercially available product to the consumer-at-large. That which the consumer purchases, while it may be generically referred to as "master" using the customary parlance of this art, is in the usual case a replica or derivative master produced by castings or so forth from an "original master".

As has been discussed in the "Background" portion of the present specification, the precise technique that has been described in connection with FIGS. 1 and 2 herein, can be utilized as set forth in my Ser. No. 473,010 application to prepare a V-cut master. The latter may then be utilized to prepare the U-channel master 15 of the present invention, by means of the technique illustrated in FIG. 4. In particular, the conical tracing element 26 is made to traverse the V-cut grooves of V-cut master 52, as shown in the left-hand portion of FIG. 4, while the cylindrical ball-ended cutting tool 14 moves in homologous fashion (via 3-D pantograph engraving machine 10) upon a workpiece 54, so as to provide cuts 56 upon such work piece of exactly the character which ensues in FIGS. 1 and 2. Thus, of course, it will be evident that the conical tracing element 26, in transversing the V-cut master 52 undergoes precisely the movements that have been illustrated at the left-hand portion of FIG. 2 herein; whereby as already mentioned, the precise pattern is established at the right-hand portion of the Figure i.e. at the U-channel master 55.

Pursuant to the present invention, and as illustrated in FIG. 5, the resultant master 15 is used in the course of preparing a finished engraved work, by once again utilizing the same 3-D pantograph engraving machine 10. In particular one substitutes for the tracing element 26 a simple cylindrical ball-ended stylus 58, having in general a uniform diameter which is approximately that of the cutting tool 14, and thus approximately that of (actually somewhat less than) the width of the U-cut channels 56. One thereupon proceeds, utilizing the said stylus 58, to trace the graphics analogs upon master 12 for which one desires to produce the corresponding graphic on work piece 62. The work cutting tool in this instance comprises a simple conical cutter 64, which preferably has the same included angle A as the tracing element 26, which was utilized to produce the original master — i.e. by using the corresponding angle, distortion is completely eliminated. It will, of course, be evident that as the cutter 64 moves in homologous fashion with the tracing stylus 58, the movement of each element is identical in the X—Y plane (i.e. except that a desired X—Y multiplication factor may be employed as is known in the pantograph engraving machines of the present type). However, the vertical (Z) excursions of the cutting tool 64 will, of course, vary with the vertical (or Z-coordinate) of stylus 58.

The peculiar and special advantage of the present arrangement, is that by virtue of the U-cut grooves present on master 12, the cylindrical tracing stylus 58 is guided in an exceedingly firm and accurate fashion, in that at all times the said tracing element is nested on its sides by the parallel walls of the U-cut channel; and at the same time, the tracing stylus 58 rides firmly at the bottom of the said channel. As previously indicated, the channel may be completely flat on its bottom portion. But preferably — where a ball-ended cutter as in FIG. 1 is used — the groove has a slightly rounded bottom, which facilitates X—Y sliding of the stylus (the stylus 58 is in such instances, preferably as well, rounded at its bottom).

It will of course further be evident that the resulting cut graphics, on work piece 62, by virtue of the X, Y and Z-directed movements of cutter 64, will have a width at the surface of the final work piece corresponding to the original graphics from which the analogs were derived, and a depth varying in accordance with such width. The net result is to produce a graphic defined by V-cut walls, but the depth of which vary in accordance with the width of the graphic — in a manner exactly resembling that displayed by hand-engraved graphics.

A further technique pursuant to which the masters 12 of the present invention may be produced is illustrated in the simplified perspective view of FIG. 6. The technique utilized herein uses aspects of the concepts set forth in Barr, U.S. Pat. No. 732,154. In particular two-dimensional graphics 70, which may be in the form of photographed or ink-drawn letters or the like, are secured to a readily destructible base 72 as, for example, of plaster-of-paris. In this instance a rotating tool 74 is used in effect as the tracing stylus, in the manner discussed in connection with FIGS. 1 and 2. In particular the rotating tool 74, having a conical cutting tip 76, is passed over the letters (or other graphics) to be converted to analogs 78 at the master work piece 80, and the workman manipulates the height (i.e. the Z-coordinate) of the tool, as to just encompass the width of the letter or other alpha-numeric — thereby destroying the photograph and portions of the underlying base 72 as the alpha-numerics are traced. The cutting tool 82 at the right side of FIG. 5, is identical to tool 14, and is controlled in precisely the fashion that has been discussed in FIGS. 1 and 2. Thus it will be obvious, that a U-channel master 84 results, having the same attributes as discussed in FIGS. 1 and 2.

The disadvantage of the method described in connection with the FIG. 6, is that considerable skill is required on the part of the operator to very accurately maintain the proper dwell for the cutting tool 74. However, in certain applications such technique may be desirable, and it will be clear that the total cost of preparing the U-channel master 84 is relatively low in comparison to the other methods described — since the cost of preparing base 72 and its overlay of photographs is very low.

Figure 7:
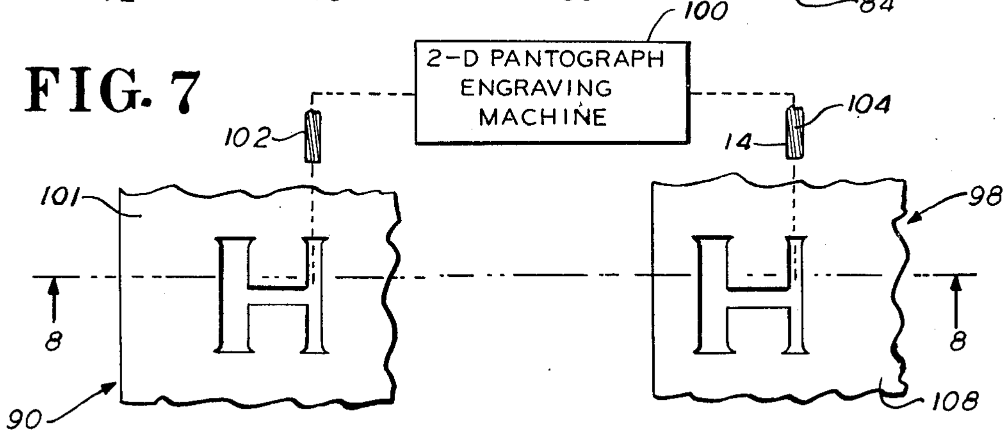
FIG. 7 is a perspective, highly schematic view, illustrating the initial step of a method for preparing masters in accordance with the invention, starting with a line-cut photo-engraving.
Figure 8:
FIG. 8 is a cross-sectional view taken along the broken line 8—8' of FIG. 7.
Figure 9:
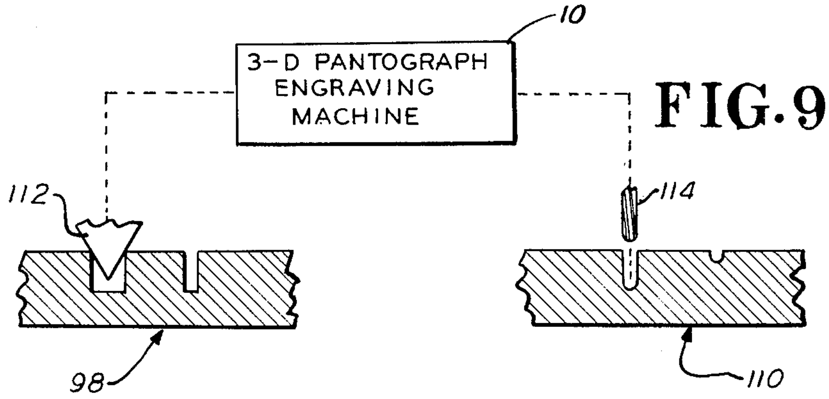
FIG. 9 is a schematic cross-section depicting the second step of the method initiated at FIG. 7.

In FIGS. 7 through 9 herein schematic steps are illustrated, which enable a line cut photo-engraving or the like to be converted into a U-channel master in accordance with the invention. Thus in FIG. 6 a line cut photoengraving 90 appears. Line cut photo-engraving 90 is of conventional construction. As is thus seen in the cross-sectional view of FIG. 8, taken along the line 8—8′ of FIG. 7, the said engraving may consist of a base 92 of a wood or similar material, overlayed with an etchable metal layer 94, as for example, of copper or other metal which is readily photo-etched by techniques known in the art. As indicated in FIG. 7, and for purposes of illustration, a line engraving of the letter "H" is present, in consequence of these known techniques. By comparing FIGS. 7 and 8, it will be seen that the structure of the line cut photo-engraving is such that the letter "H" is defined by channels 96 of uniform depth — which channels are bounded by relatively flat walls, the spacing of such walls varying in accord with the portion of the letter.

In accordance with this aspect of the present invention, the line photo-engraving 90 is initially converted into an intermediate master 98 by use of a 2-dimensional pantograph engraving machine 100. Basically one may use for such purposes, any of the conventional 2-dimensional pantograph machines; or can use the 3-dimensional machine previously discussed herein, operating in a 2-dimensional mode. Thus as suggested in FIG. 7, the 2-dimensional pantograph 100 may be used with a cylindrical stylus 102 as a tracing element, and a rotating cylindrical cutting tool 104 as the cutter. It will be appreciated by those skilled in the art pertinent to the 2-dimensional mode of operation here being considered, a conventional use of the 2-D pantograph machine is being made. In particular, the stylus 102 may have a diameter "D", less than that of any of the channels 96 to be traced; and similarly the cylindrical cutting tool 104 may have a corresponding diameter. Thus as one "traces" the letter "O" in the photo-engraving 90 with stylus 102, one may pass a multiple number of times over given portions of the letter. The object is one of covering all points defining the letter — although this may take multiple passes to do so.

The basic purpose of the operation as set forth in FIGS. 7 and 8 is essentially one of producing intermediate master 98, at which the letter "O" is defined by channels 106 having the same width as in the line engraving 90, but having sufficient depth so as to enable production therefrom of a U-channel master by the technique of FIGS. 1 and 2 herein. In order to accomplish such result, all that is necessary in using the 2-dimensional machine mentioned, is to position the work piece 108 which will become intermediate master 98, at a higher vertical position, i.e. at a higher vertical (Z) plane than that in which line engraving 90 is positioned. When this is effected, and the operations just described carried out, it will be obvious that an intermediate master 98 having cross-sectional characteristics as indicated in FIG. 8, will ensue.

Thereafter in the practice of the invention, and in order to provide a corresponding U-channel master 110, one need only utilize the intermediate master 98 in the manner that has been described in connection with FIGS. 1 and 2. Thus in FIG. 9 the intermediate master 98, shown in schematic cross-section, is utilized in conjunction with a 3-D pantograph engraving machine 10, of the type heretofore discussed. In this instance a conical stylus 112 is now utilized to trace in a single pass the varying width (but uniformly deep) grooves of the intermediate master 108. At the same time a cylindrical cutter 114 is positioned as the element moving homologously with the conical tip stylus 112; and thus the ball-ended cylindrical cutter 114 proceeds to cut the work piece 108, as to yield the same type U-channel master 110 that is provided in accordance with the procedure discussed in FIGS. 1 and 2 herein.

Of course it will be evident that one of the principal advantages of the techniques described in FIGS. 7 through 9 is that one initiates preparation of the U-channel master 110, from a line cut photo-engraving — and the latter, as is known in the graphics art, can be prepared with enormous variety and subtlety of artistic expression. It should be pointed out that the intricacies of the photo-engraving line cut will require some hand-finishing for the intermediate master 98, especially at sharp cornered or tapering portions of the said line engraving — in order to eliminate the radius resulting from the cylindrical cutter.

Figure 10:
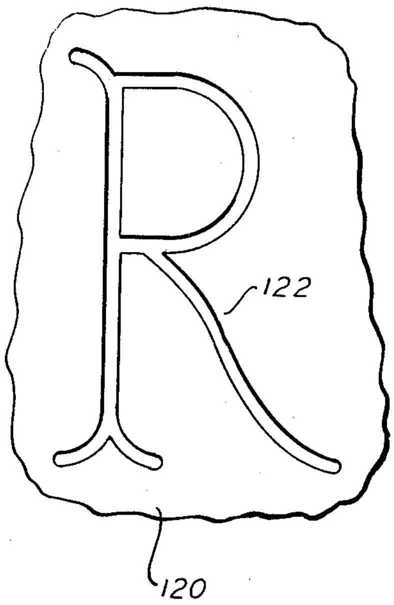
FIG. 10 is a plan view of a portion of a master in accordance with the invention, and illustrates the appearance of a representative graphic.
Figure 11:
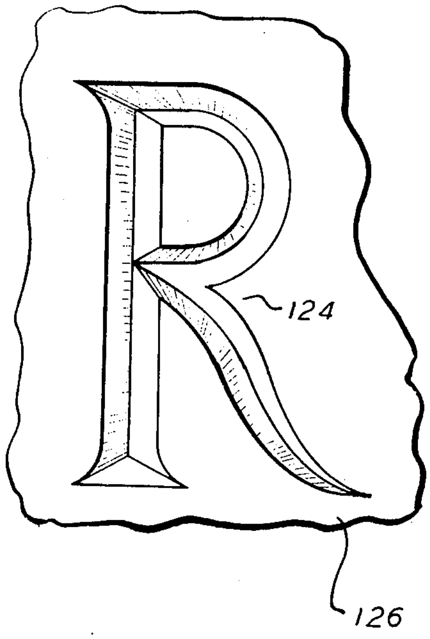
FIG. 11 is a plan view of a workpiece carrying the derivative graphic corresponding to that of FIG. 10.

In FIG. 10 a plan view appears of a portion 120 of a U-channel master in accordance with the invention. A graphic analog 122, in the form of a letter "R", is shown thereon. A derivative graphic 124 appears in FIG. 11, i.e. the graphic 124 is formed in work piece 126 by the technique of FIG. 5. Comparison of FIGS. 10 and 11 will render clear that the center lines of the graphic analog provided on the U-channel masters of the invention define patterns which are geometrically similar to those defined by the center lines of the graphics derived therefrom. The total visual appearances of the two however, are quite distinct. This fact, in turn, renders it quite difficult for the workman to visualize the product which will result from his use of the U-channel master.

Figure 12:
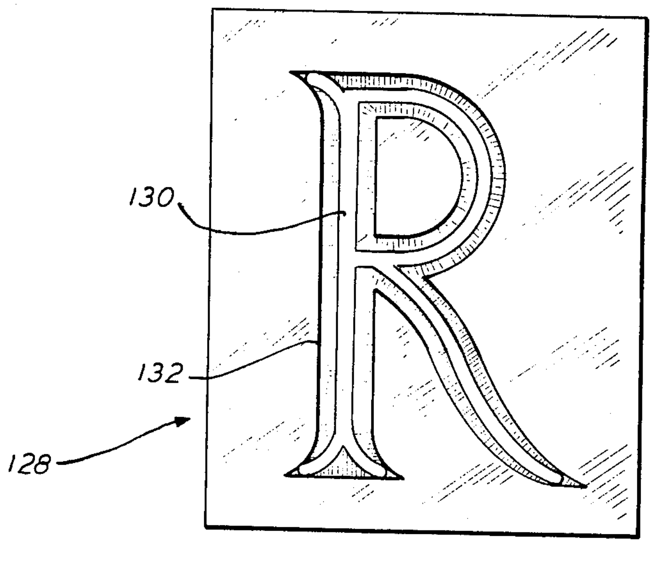
FIG. 12 is a plan view of a master in accordance with the invention, which incorporates features which aid the user in visualizing the form of the derivitative graphic.

In FIG. 12 a master 128 is shown, which overcomes the aforementioned difficulty. Thus the channels 130 defining the graphic "R" are surrounded with an overlaid pattern 132 which immediately indicates to the user the precise appearance of the derivative graphic which will be developed from use of master 128. It may be noted here, that if the material comprising master 128 is transpa-ent (e.g. of lucite), then the pattern 132 can be formed on either the upper or lower face of the master — the pattern 132 being in either case aligned with the pattern of the U-channels. The pattern 132 can be screen printed or otherwise coated upon master 128, or can be formed of adherent foils, etc.

While the present invention has been particularly described in terms of specific embodiment thereof, it will be understood in view of the instant disclosure, that enormous variations upon the invention are now enabled to those skilled in the art, which variations yet reside in the scope of the present teaching. Accordingly the invention is to be broadly construed and limited only by the scope and spirit of the claims now appended hereto.

I claim:

1. A master for use in conjunction with 3-dimensional pantograph engraving machines, said master comprising a plate wherein analogs of graphics to be engraved upon workable stock are defined by constant width U-cut channels, the center line of said U-channel defining a pattern geometrically similar to the said graphics to be engraved, and the depth of said U-channels being proportional at each point to the width at the surface of said work piece of the corresponding graphic to be engraved.

2. A U-channel master in accordance with claim 1, wherein the bottom of said U-cut channel are rounded to facilitate tracing of said channel by a cylindrical stylus having rounded bottom characteristics.

3. A master in accordance with claim 1, including a pattern at a visible surface of said master, said pattern being aligned with the pattern of said U-channels and conforming to the said corresponding graphic, whereby to advise a user of the precise appearance of said corresponding graphic.

* * * * *